US008131554B2

(12) United States Patent
Higgins (10) Patent No.: US 8,131,554 B2
(45) Date of Patent: Mar. 6, 2012

(54) METHOD AND SYSTEM FOR TEXT RETRIEVAL FOR COMPUTER-ASSISTED ITEM CREATION

(75) Inventor: Derrick Higgins, Highland Park, NJ (US)

(73) Assignee: Educational Testing Service, Princeton, NJ (US)

( * ) Notice: Subject to any disclaimer, the term of this patent is extended or adjusted under 35 U.S.C. 154(b) by 0 days.

(21) Appl. No.: 13/046,302

(22) Filed: Mar. 11, 2011

(65) Prior Publication Data

US 2011/0166853 A1 Jul. 7, 2011

Related U.S. Application Data

(63) Continuation of application No. 11/328,962, filed on Jan. 10, 2006, now Pat. No. 7,912,722.

(60) Provisional application No. 60/642,727, filed on Jan. 10, 2005.

(51) Int. Cl.
*G09B 3/00* (2006.01)
*G06F 17/27* (2006.01)
*G10L 15/08* (2006.01)
*G10L 11/00* (2006.01)

(52) U.S. Cl. ............. 704/270; 434/350; 704/9; 704/243
(58) Field of Classification Search .................. 434/156, 434/167; 704/243, 270
See application file for complete search history.

(56) References Cited

U.S. PATENT DOCUMENTS

| | | | |
|---|---|---|---|
| 5,794,216 | A | 8/1998 | Brown |
| 6,018,617 | A | 1/2000 | Sweitzer et al. |
| 6,032,135 | A | 2/2000 | Molano et al. |
| 6,704,741 | B1 | 3/2004 | Lively, Jr. et al. |
| 7,333,945 | B1 | 2/2008 | Alling |
| 7,377,785 | B2 | 5/2008 | Ullman et al. |
| 2003/0154067 | A1 | 8/2003 | Wen et al. |
| 2004/0076941 | A1 | 4/2004 | Cunningham et al. |

FOREIGN PATENT DOCUMENTS

WO   WO 2006/074461 A2   7/2006

OTHER PUBLICATIONS

Burnard, Lou, Dodd, Tony; Xara: an XML aware tool for corpus searching; http://www.oucs.ox.ac.uk/rts/xaira/Talks/cl2003.html; 2006.
Cui, Hang, Kan, Min-Yen, Chua, Tat-Seng, Xiao, Jing; A Comparative Study on Sentence Retrieval for Definitional Question Answering; SIGIR Workshop on Information Retrieval for Answer Questioning (IR4QA); 2004.

*Primary Examiner* — Justin Rider
(74) *Attorney, Agent, or Firm* — Jones Day (57) ABSTRACT

A tool, method, and system for use in the development of sentence-based test items are disclosed. The tool may include a user interface that may include a database selection field, a sentence pattern entry field, an option pane, and an output pane. The tool may search a database for one or more sentences and may generate one or more responses to the one or more sentences. The one or more sentences and one or more responses may be used to produce the sentence-based test items. The tool may allow test items to be developed more quickly and easily than manual test item authoring. Accordingly, test item development costs may be lowered and test security may be enhanced.

30 Claims, 5 Drawing Sheets

If the control panel is damaged in shipment, __________ will be sent to replace it.

- Ⓐ  other
- Ⓑ  another
- Ⓒ  otherwise
- Ⓓ  other one

FIG. 1

Throughout the animal kingdom, _____________ bigger than the elephant.

- A    whale is only the
- B    only the whale is
- C    is the whale only
- D    only the whale is the

METHOD AND SYSTEM FOR TEXT RETRIEVAL FOR COMPUTER-ASSISTED ITEM CREATION

CROSS-REFERENCE TO RELATED APPLICATION

This patent application is a continuation of U.S. patent application Ser. No. 11/328,962, now U.S. Pat. No. 7,912,722 filed Jan. 10, 2006, and entitled "Method and System for Text Retrieval for Computer-Assisted Item Creation," which claims priority to, and incorporates by reference in its entirety, U.S. Provisional Patent Application No. 60/642,727, entitled "Method and System for Text Retrieval for Computer-Assisted Item Creation," filed Jan. 10, 2005.

TECHNICAL FIELD

The present invention relates generally to the field of test item generation. In particular, the present invention relates to retrieving text suitable for a sentence-based test item by scanning a corpus for a particular search string including specific words, phrases, and/or grammatical constructions.

BACKGROUND

Standardized testing is prevalent in the United States today. Such testing is used for higher education entrance examinations and achievement testing at the primary and secondary school levels. The prevalence of standardized testing in the United States has been further bolstered by the No Child Left Behind Act of 2001, which emphasizes nationwide test-based assessment of student achievement.

Traditional multiple-choice assessment examinations contain one or more sections, each including a series of test items. An assessment examination presents several answer choices (i.e., A, B, C, D, etc.) for each test item. An examinee is instructed to determine the best answer from the set of choices and indicate his or her choice on an answer sheet.

Numerous educational assessments include a writing component. Some tests, such as the SAT® test (a college-entrance examination) and the GMAT® test (a business-school entrance examination) assess writing proficiency by eliciting a sample of the examinee's writing directly by, for example, requiring completion of a "constructed-response" task. Other tests, such as the GRE® test (a graduate school examination), the TOEIC® test (Test of English for International Communication), and the PRAXIS™ test (a teacher proficiency examination) assess writing (or verbal skills more generally) through test items aimed at particular aspects of grammar, usage and/or vocabulary. Questions on such tests are generally either multiple-choice items or free-response items based on a single sentence. For example, the examinee might be asked to fill in an appropriate word for a blank inserted in a sentence.

Typically, test items are generated manually once test developers determine that a test requires a certain number of items. Items can be generated to test for comparative construction usage, pronoun usage, redundant word usage, and the like. Upon creating such test items, the items are often pre-tested to determine each item's difficulty level empirically.

Accordingly, item development can be a slow process. Currently, test developers must think of a scenario in which to embed relevant grammatical material. Then, the developers must determine the particular phrasing to use. For example, in the case of items which test an examinee's use of the comparative, the developers might have to decide whether an item will test comparative adjectives or nouns (i.e., more forgetful vs. more cheese) and whether to use the morphological or periphrastic form of the comparative (i.e., faster vs. more quickly). Finally, test developers must determine an appropriate set of distractor responses for the item.

What is needed is a method and system for more quickly generating test items that test aspects of grammar, usage, and/or vocabulary.

A need exists for an application that searches corpora for existing sentences that might be suitable for sentence-based test items.

A further need exists for an application that generates natural-sounding, rather than stilted, test items.

The present invention is directed to solving one or more of the above-listed problems.

SUMMARY

In an embodiment, a tool for use in the development of sentence-based test items may include a user interface that may include a database selection field, a sentence pattern entry field, an option pane, and an output pane. The tool may search a database for one or more sentences and may generate one or more responses to the one or more sentences. The sentences and responses may be used to produce the sentence-based test items.

The database selection field may select the database that is used to search for the one or more sentences. The database may include text material. The sentence pattern entry field may be used to construct a sentence pattern that may be used to search the database for the one or more sentences and the option pane may be used to construct the one or more response patterns that may be used to generate one or more responses based on the one or more sentences. The output pane may display the one or more sentences and the one or more responses.

In an embodiment, the user interface may include an icon for beginning the search of the database. In another embodiment, the user interface may further include one or more search parameters including a minimum and a maximum sentence length and a minimum and a maximum number of sentences returned by the search of the database. In a further embodiment, the user interface may include a language search icon and a phonetic search icon.

In an embodiment, a method of developing sentence-based test items may include using a database selection field to select a database, using a sentence pattern entry field to construct a sentence pattern used to search the database for one or more sentences, using an option pane to construct one or more response patterns used to generate one or more responses based on the one or more sentences, searching the database for the one or more sentences, and generating the one or more responses, wherein the one or more sentences and one or more responses are used to form the sentence-based test items, and displaying the sentence-based test items in an output pane.

In an embodiment, a system for developing sentence-based test items may include a processor, a processor-readable storage medium in communication with the processor, and a display. The processor-readable storage medium may contain one or more programming instructions for performing the method of developing sentence-based test items.

BRIEF DESCRIPTION OF THE DRAWINGS

Aspects, features, benefits and advantages of the embodiments of the present invention will be apparent with regard to the following description, appended claims and accompanying drawings where:

DETAILED DESCRIPTION

Before the present methods, systems and materials are described, it is to be understood that this invention is not limited to the particular methodologies, systems and materials described, as these may vary. It is also to be understood that the terminology used in the description is for the purpose of describing the particular versions or embodiments only, and is not intended to limit the scope of the invention which will be limited only by the appended claims.

It must also be noted that as used herein and in the appended claims, the singular forms "a," "an," and "the" include plural references unless the context clearly dictates otherwise. Thus, for example, reference to a "test item" is a reference to one or more test items and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments of the invention, the preferred methods, materials, and devices are now described. All publications mentioned herein are incorporated by reference. Nothing herein is to be construed as an admission that the invention is not entitled to antedate such disclosure by virtue of prior invention.

Test items from the same class may cover the same or similar content, but may vary in superficial aspects, such as wording, the order in which distractors and the correct answer occur in a multiple-choice item, and the like. For example, mathematical test items dealing with the Pythagorean theorem may include essentially the same content ($a^2+b^2=c^2$), but with values for the variables that differ from item to item. Accordingly, it may be beneficial to generate these test items from the same general item model. For the test items described below in reference to FIGS. 1 and 2, which are designed to assess writing skills, an item model may encapsulate a certain narrow content area, such as the use of the word "only" with a subject noun phrase in its focus. The choice of sentences instantiating this pattern may vary.

Another criterion which may be used as a basis for designing item models is whether the variation among instances from the model are systematically related to the difficulty level of the test item. For example, in the exemplary Pythagorean theorem test item model, instances may vary in 1) the length of the triangle's sides, 2) whether the lengths are integers or real numbers, and 3) whether the examinee is asked to solve for the hypotenuse or one of the other sides. The item model may be more useful if it allows test developers to predict the effect that each variation has on the test item's difficulty. For verbal test items, the variables affecting the difficulty of the test item may be, for example, the particular distractor phrases and the vocabulary level of the text.

Figure 1:
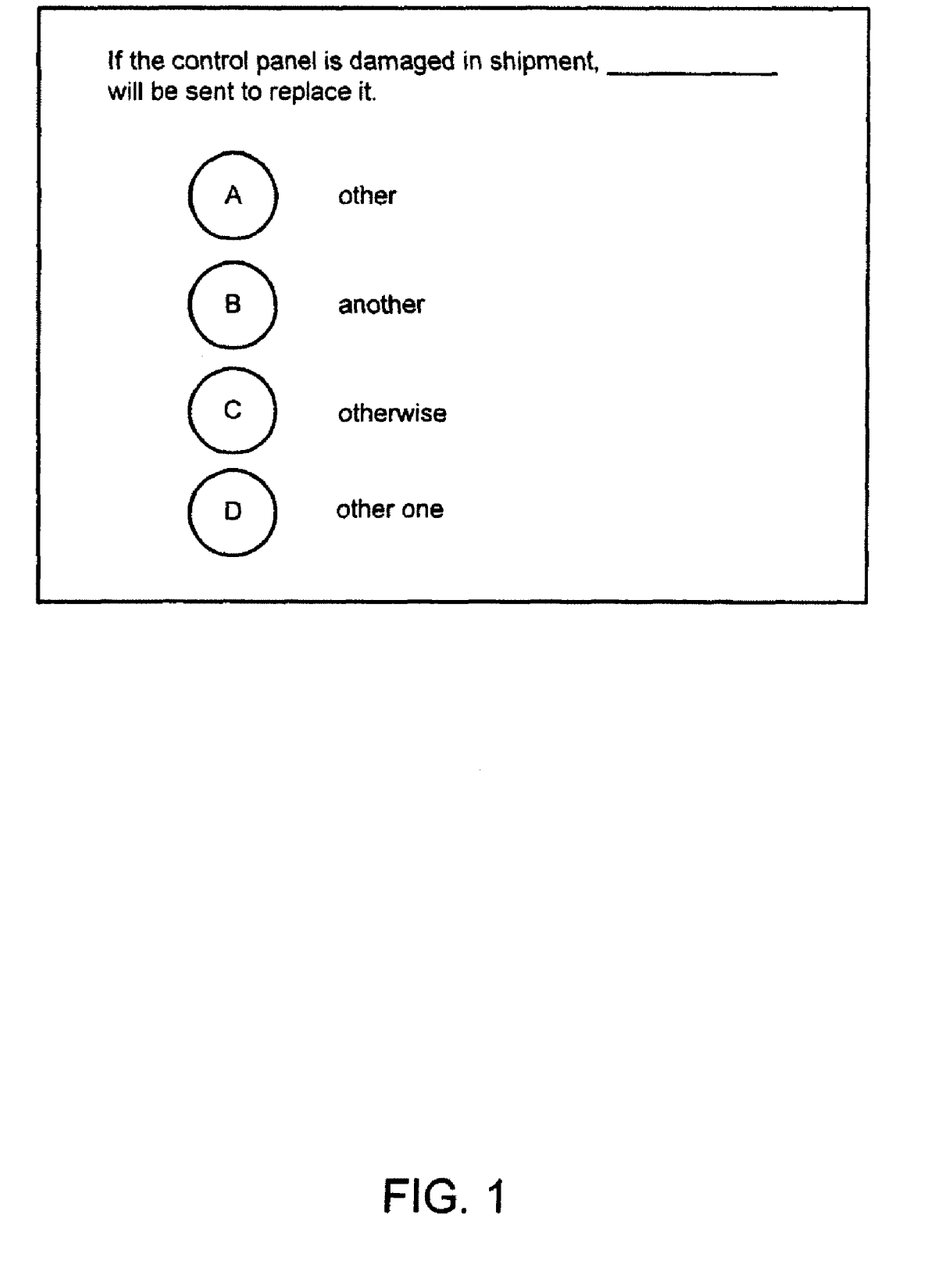
FIG. 1 depicts a first exemplary test item according to an embodiment.
Figure 2:
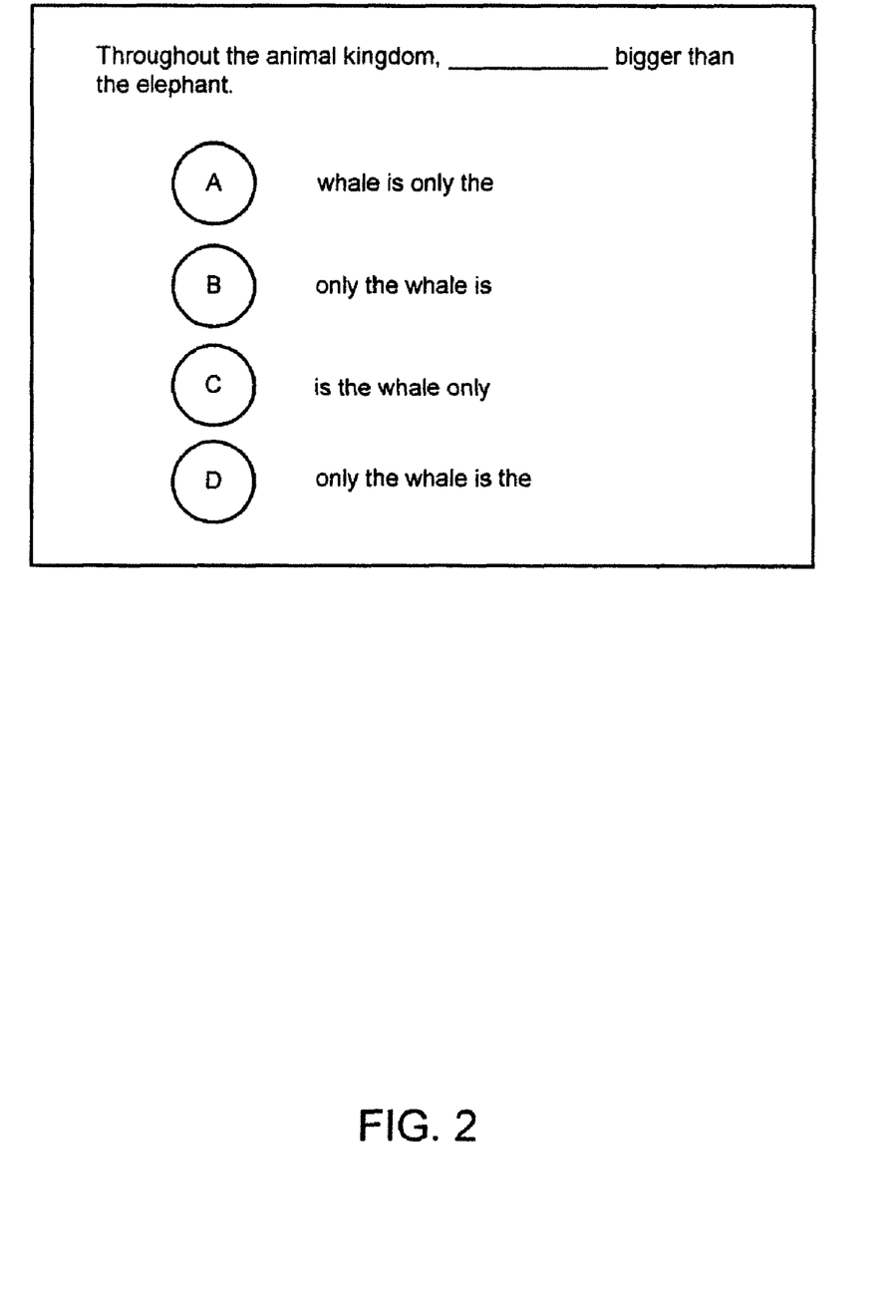
FIG. 2 depicts a second exemplary test item according to an embodiment.

Each of FIGS. 1 and 2 depicts an exemplary sentence-based test item according to an embodiment. Each depicted test item may include a single sentence in the stem (the main body) of the test item and four answer options. The examinee may be asked to select the option which best completes the sentence (when the option text is substituted for the lacuna in the stem).

FIG. 1 depicts a test item which assesses the examinee's ability to properly use the pronoun "another" to refer to a nominal expression. The distractor answers (incorrect responses) may include other words and phrases which are morphologically related to the proper response ("another").

FIG. 2 depicts a test item which tests the use of the term "only" to contrastively focus a nominal. In this case, the distractor answers may include various incorrect permutations of the correct word order.

The construction of test items to assess writing skills may be performed by using full regular expressions to identify candidate sentences. Due to the test items being based on grammatical constructions and not on single vocabulary items, regular expressions may be required. For example, sentences suitable for satisfying the requirements of the test item in FIG. 1 may be fairly simple to locate in a corpus. Since the item has to do with the correct use of the word "another," a search of a database that returns all sentences using that word may be performed. However, such a search may result in too many sentences being returned. A more focused search including only sentences with "another" functioning as a complete noun phrase and referring to a nominal expression earlier in the same sentence may result in a targeted group of sentences that are most similar to the current test item.

Similarly, a sentence similar to the stem in FIG. 2 may include the word "only," followed by a subject noun phrase, followed by a verb. Finding a sentence simply containing the word "only" may not be sufficient since "only" may be joined with phrases of other word categories (verb, adjective, etc.) or noun phrases other than a subject. Determining which characteristics to use for a search may depend upon the type of test item that the test developer desires to use.

For some test items, the appearance of a specific word within a sentence may not be necessary. For example, distinguishing characteristics for items testing proper verbal agreement may include whether a sentence has a main verb and whether the sentence has multiple noun phrases earlier in the sentence with which the verb could potentially agree. In such a search, an exact-match search for specific words may be insufficient to return satisfactory sentences from the corpus. Instead, a way of searching for sentences that match a sentence pattern may be used. The sentence pattern may correspond to, for example, a grammatical construction. Accordingly, the sentence patterns that test developers describe may make reference to one or more of a specific word or a more general class, such as "a noun" or "a noun phrase."

Figure 3:
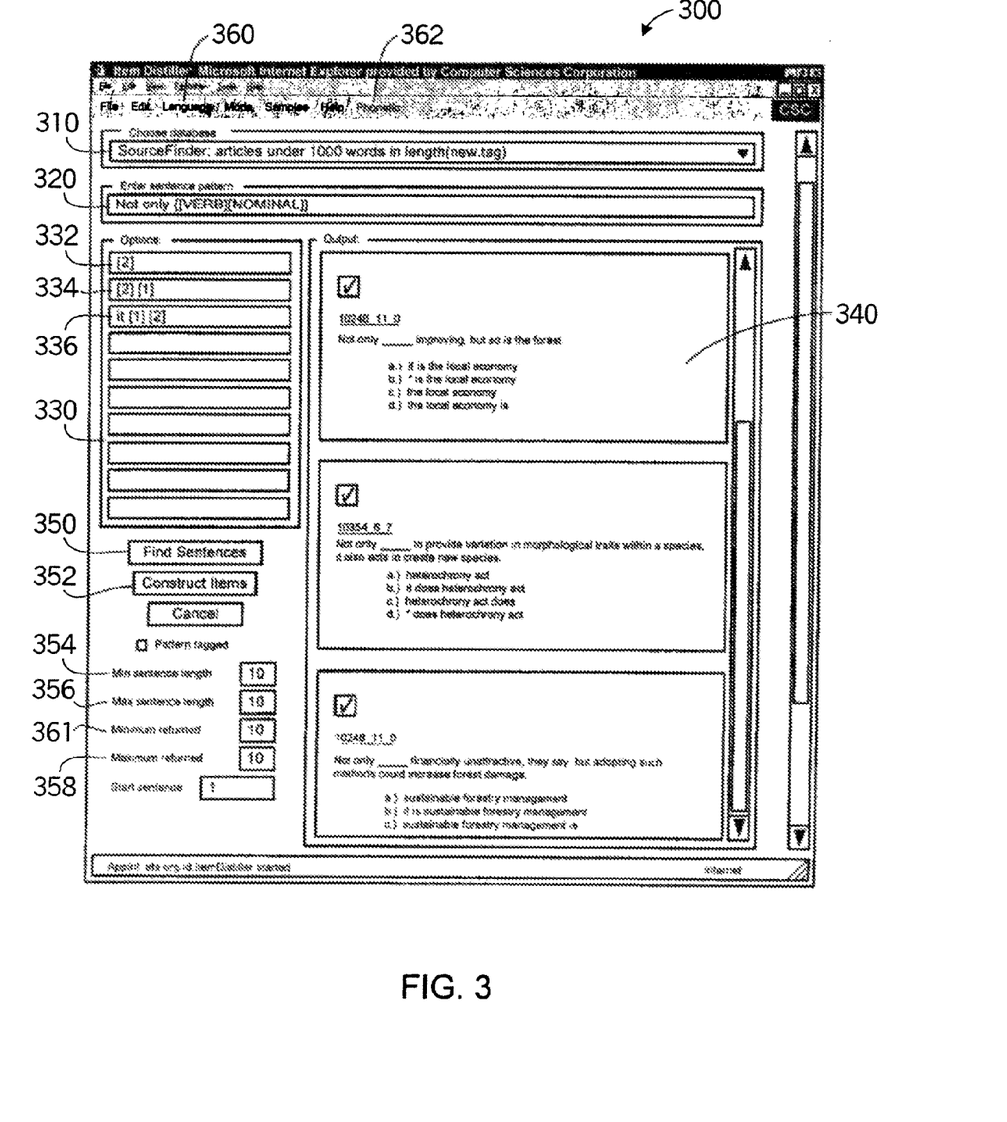
FIG. 3 depicts a graphical user interface for retrieving text from a database and generating test items according to an embodiment.

FIG. 3 depicts a graphical user interface for retrieving text from a corpus and generating test items according to an embodiment. A graphical user interface 300 may include a database selection field 310, a sentence pattern entry field 320, an option pane 330, and an output pane 340.

The database selection field 310 may be used to select a database from which to select sentences for test items. As shown in FIG. 3, the presently selected database may include articles under 1000 words in length. The disclosed database merely exemplifies databases that may be selected. It is not intended that the present disclosure be limited to such a database, but rather that all possible databases containing text material be included within the scope of this disclosure.

The sentence pattern entry field 320 may be used to construct a sentence pattern that may be used to search the database for one or more sentences. As shown in FIG. 3, the entered sentence pattern ("Not only {[VERB] [NOMI-NAL]}") may permit a search for one or more sentences including the words "Not only" followed by a verb that is followed by a nominal phrase that relates to the verb. The braces ("{" and "}") may be used to define the limits of the lacuna for each selected sentence. The syntax shown in the sentence pattern entry field 320 is merely exemplary of syntax used to define sentence patterns for a search.

A test developer may use the option pane 330 to construct one or more response patterns that may be used to generate one or more responses based on the one or more sentences. The responses may include a correct response and incorrect or distractor responses. As shown in FIG. 3, three distractor responses may be generated for each selected sentence. A first distractor response 332 may include the nominal phrase from the selected sentence (represented in the option pane 330 by "[2]", i.e., the second-listed bracketed search element). A second distractor response 334 may include the nominal phrase followed by the verb from the selected sentence (represented in the option pane 330 by "[2][1]"). A third distractor response 336 may include the word "it" followed by the verb followed by the nominal phrase (represented in the option pane 330 by "it [1][2]"). Alternate and/or additional distractor response patterns may be used to define the answer choices for each selected sentence.

The output pane 340 may display the one or more sentences and the one or more responses. As shown in the output pane 340, the one or more sentences and the one or more responses may be used to form the sentence-based test items. Each entry in the output pane 340 may correspond to a sentence matching the sentence pattern defined in the sentence pattern entry field 320 that is located within the corpus. As described above, the lacuna may correspond to the braced portion of the sentence pattern. Moreover, the distractor responses may correspond to the definitions in the option pane 330. The distractor responses and correct response may be randomly ordered or an order may be specified.

In an embodiment, a graphical user interface 300 may further include buttons to begin a search 350 and construct test items 352 (e.g., by inserting distractor responses). The graphical user interface may also define one or more search parameters, such as a minimum sentence length (defined as, for example, the number of words in the sentence) 354, a maximum sentence length 356, and a minimum 361 and a maximum 358 number of sentences returned by the search.

In an embodiment, the graphical user interface 300 may be used to select a language 360 to be used for the search. Selecting the language 360 may further restrict the database that is searched. For example, setting the language 360 to English may result in the return of sentences from English-language texts.

In an alternate embodiment, other aspects of linguistic structure may also be incorporated into the graphical user interface and its underlying code structure. For example, a phonetic search icon 362 may be added which may permit a test developer to search for sentences having specific sound patterns. Such an embodiment may be useful in selecting sentences for a read-aloud task. Such a task may be desirable, for example, for a test of English as a foreign language.

In an alternate embodiment, different question types may be generated for test items. For example, each of the test items shown in FIGS. 1-3 includes a stem with a plurality of responses (including distractors and the correct response) which fill in a lacuna within the stem. In an alternate test item type, no stem may be used, but each response may include a complete sentence in which the distractor response or correct response has been inserted. In yet another type of test item, the examinee may be required to identify the location of a grammatical error within a sentence presented in the stem of the test item. Alternate and/or additional test item types are also encompassed within the scope of the present disclosure.

Figure 4:
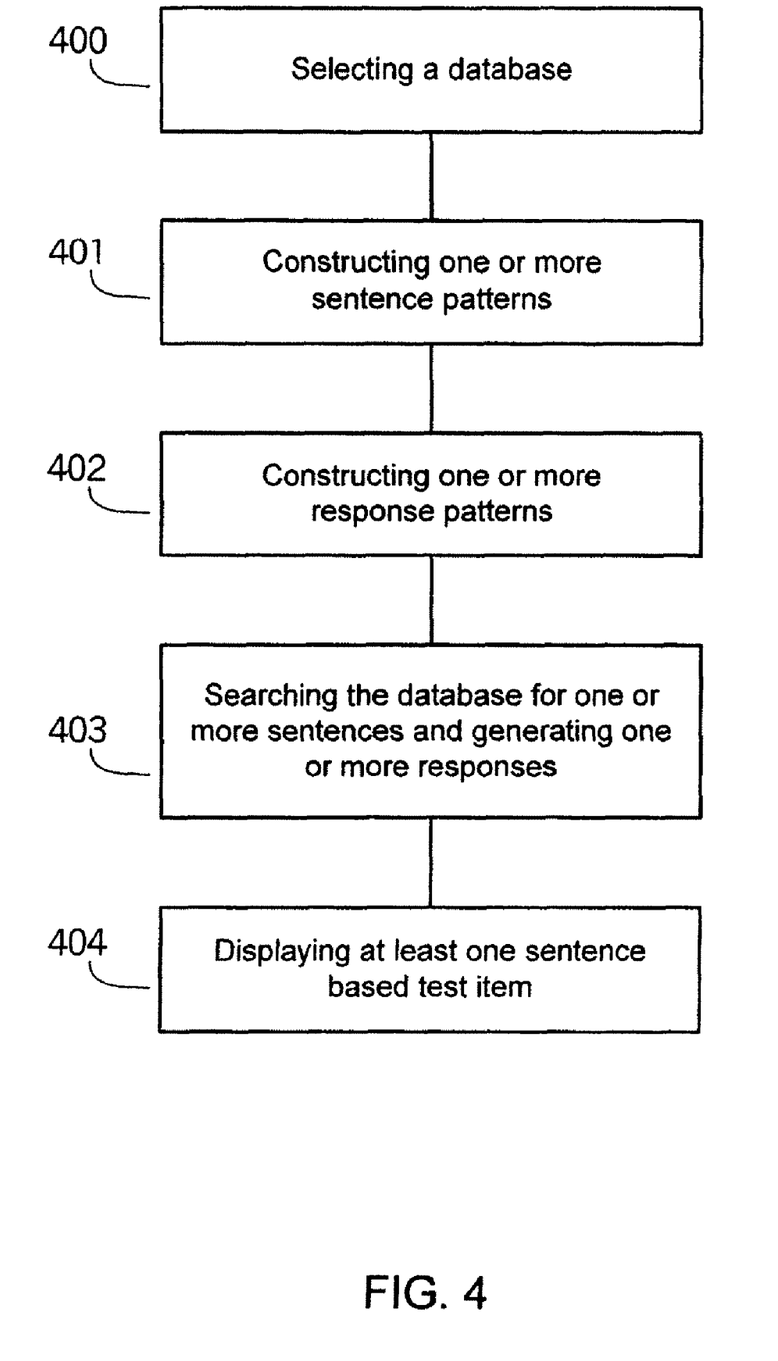
FIG. 4 depicts an exemplary method of developing sentence-based test items according to an embodiment.

FIG. 4 shows a method of developing sentence-based test items. The method may include using the database selection field to select a database 400, using the sentence pattern entry field to construct a sentence pattern used to search the database for one or more sentences 401, using the option pane to construct one or more response patterns used to generate one or more responses based on the one or more sentences 402, searching the database for the one or more sentences and generating the one or more responses 403, wherein the one or more sentences and one or more responses are used to form the sentence-based test items, and displaying at least one sentence-based test item in output pane 404.

Figure 5:
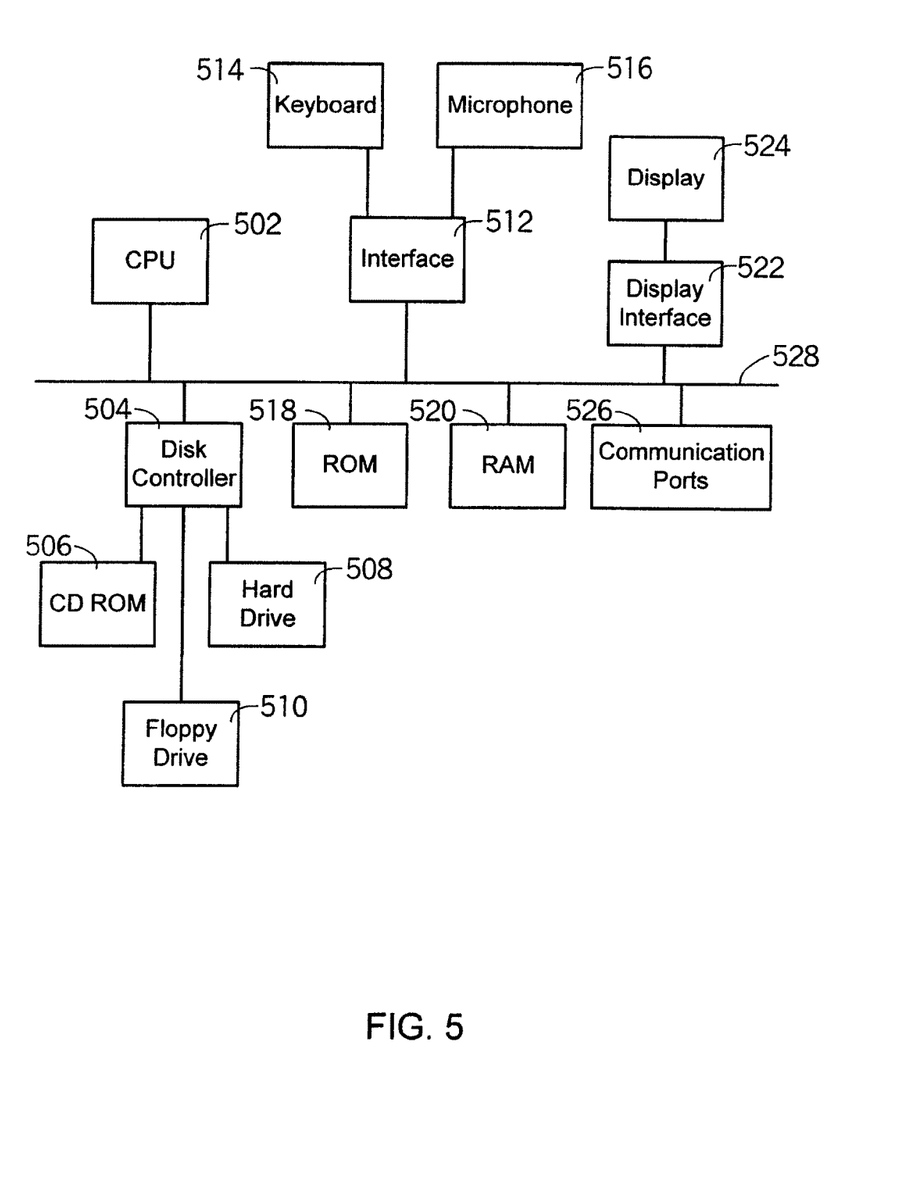
FIG. 5 depicts an exemplary system for the development of sentence-based test items according to an embodiment.

FIG. 5 shows a block diagram of exemplary hardware that may be used to contain and/or implement the program instructions of system embodiments of the present invention. A bus 528 may serve as the information highway interconnecting the other illustrated components of the hardware. A processor 520, such as a central processing unit (CPU), may perform calculations and logic operations required to execute a program. A processor-readable storage medium 502, such as read only memory (ROM) 518 and random access memory (RAM) 520, may be in communication with the processor 520 and may contain one or more programming instructions for performing the method of developing sentence-based test items. Optionally, program instructions may be stored on a computer readable carrier such as a digital disk, recordable memory device, or other recording medium, a communications signal, or a carrier wave.

A disk controller 504 interfaces one or more optional disk drives to the system bus 528. These disk drives may be external or internal floppy disk drives such as 510, external or internal CD-ROM, CD-R, CD-RW or DVD drives such as 506, or external or internal hard drives 508. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 504, the ROM 518 and/or the RAM 520. Preferably, the processor 502 may access each component as required.

A display interface 522 may permit information from the bus 528 to be displayed on a display 524 in audio, graphic, or alphanumeric format. Communication with external devices may optionally occur using various communication ports 526.

In addition to the standard computer-type components, the hardware may also include data input devices, such as a keyboard 514, or other input device 516, such as a microphone, remote control, pointer, mouse and/or joystick.

It is to be understood that the invention is not limited in its application to the details of construction and to the arrangements of the components or steps set forth in this description or illustrated in the drawings. The disclosed method and system are capable of other embodiments and of being practiced and carried out in various ways. Hence, it is to be understood that the phraseology and terminology employed herein are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the disclosed embodiments.

What is claimed is:

1. A computer-readable method for development of sentence-based test items, comprising:
   searching a database to locate a sentence of a particular syntax based upon a user-specified syntax pattern entered in a sentence pattern entry field, the located sentence matching the syntax pattern;
   generating a sentence-based test item based on the located sentence, wherein a correct answer for the sentence-based test item is based on the located sentence, and wherein a distractor answer for the sentence-based test item is based on the located sentence and a variation of the user-specified syntax pattern; and
   storing the sentence based test item.

2. The method of claim 1, further comprising:
   displaying a graphical user interface on a display, the graphical user interface including a database selection field, the sentence pattern entry field, an option pane, and an output pane.

3. The method of claim 2, wherein the graphical user interface further comprises one or more search parameters comprising a minimum and maximum sentence length and a minimum and maximum number of sentences returned by a search of the database.

4. The method of claim 2, wherein the database selection field is used to select the database, wherein the database comprises text material.

5. The method of claim 1, wherein the syntax pattern includes a specification of at least one general word type.

6. The method of claim 5, wherein the general word type is noun, nominal, verb, adjective, or adverb.

7. The method of claim 1, wherein the variation of the user-specified syntax pattern is user entered.

8. The method of claim 1, wherein the variation of the user-specified syntax pattern is entered using an option pane of a display.

9. The method of claim 1, wherein the sentence based test items are included on an examination.

10. The method of claim 1, wherein the sentence based test item is a multiple choice test item.

11. A computer-implemented system for development of sentence based test items, comprising:
    one or more data processors;
    a computer-readable medium encoded with instructions for commanding the one or more data processors to execute steps that include:
      searching a database to locate a sentence of a particular syntax based upon a user-specified syntax pattern entered in a sentence pattern entry field, the located sentence matching the syntax pattern;
      generating a sentence-based test item based on the located sentence, wherein a correct answer for the sentence-based test item is based on the located sentence, and wherein a distractor answer for the sentence-based test item is based on the located sentence and a variation of the user-specified syntax pattern; and
      storing the sentence based test item.

12. The computer-implemented system of claim 11, wherein the steps further include:
    displaying a graphical user interface on a display, the graphical user interface including a database selection field, the sentence pattern entry field, an option pane, and an output pane.

13. The computer-implemented system of claim 12, wherein the graphical user interface further comprises one or more search parameters comprising a minimum and maximum sentence length and a minimum and maximum number of sentences returned by a search of the database.

14. The computer-implemented system of claim 12, wherein the database selection field is used to select the database, wherein the database comprises text material.

15. The computer-implemented system of claim 11, wherein the syntax pattern includes a specification of at least one general word type.

16. The computer-implemented system of claim 15, wherein the general word type is noun, nominal, verb, adjective, or adverb.

17. The computer-implemented system of claim 11, wherein the variation of the user-specified syntax pattern is user entered.

18. The computer-implemented system of claim 11, wherein the variation of the user-specified syntax pattern is entered using an option pane of a display.

19. The computer-implemented system of claim 11, wherein the sentence based test items are included on an examination.

20. The computer-implemented system of claim 11, wherein the sentence based test item is a multiple choice test item.

21. A tangible computer-readable medium encoded with instructions for commanding one or more data processors to execute a method for development of sentence-based test items, comprising:
    searching a database to locate a sentence of a particular syntax based upon a user-specified syntax pattern entered in a sentence pattern entry field, the located sentence matching the syntax pattern;
    generating a sentence-based test item based on the located sentence, wherein a correct answer for the sentence-based test item is based on the located sentence, and wherein a distractor answer for the sentence-based test item is based on the located sentence and a variation of the user-specified syntax pattern; and
    storing the sentence based test item.

22. The computer-readable medium of claim 21, wherein the method further comprises:
    displaying a graphical user interface on a display, the graphical user interface including a database selection field, the sentence pattern entry field, an option pane, and an output pane.

23. The computer-readable medium of claim 22, wherein the graphical user interface further comprises one or more search parameters comprising a minimum and maximum sentence length and a minimum and maximum number of sentences returned by a search of the database.

24. The computer-readable medium of claim 22, wherein the database selection field is used to select the database, wherein the database comprises text material.

25. The computer-readable medium of claim 21, wherein the syntax pattern includes a specification of at least one general word type.

26. The computer-readable medium of claim 25, wherein the general word type is noun, nominal, verb, adjective, or adverb.

27. The computer-readable medium of claim 21, wherein the variation of the user-specified syntax pattern is user entered.

28. The computer-readable medium of claim 21, wherein the variation of the user-specified syntax pattern is entered using an option pane of a display.

29. The computer-readable medium of claim 21, wherein the sentence based test items are included on an examination.

30. The computer-readable medium of claim 21, wherein the sentence based test item is a multiple choice test item.

* * * * *